(12) United States Patent
Barnes

(10) Patent No.: US 6,540,207 B1
(45) Date of Patent: Apr. 1, 2003

(54) CABLE HANGING SYSTEM

(75) Inventor: Donald L. Barnes, Orange, MA (US)

(73) Assignee: Harris Manufacturing Inc., Orange, MA (US)

( * ) Notice: Subject to any disclaimer, the term of this patent is extended or adjusted under 35 U.S.C. 154(b) by 0 days.

(21) Appl. No.: 10/116,989

(22) Filed: Apr. 8, 2002

(51) Int. Cl.$^7$ .............................................. B65H 59/00
(52) U.S. Cl. ....................... 254/134.3 R; 254/134.3 PA
(58) Field of Search ............................... 254/134.3 PA, 254/134.3 FT, 134.3 SC, 134.3 R; 294/64.1, 19.1, 16, 106

(56) References Cited

U.S. PATENT DOCUMENTS

| | | | |
|---|---|---|---|
| 3,134,575 A | | 5/1964 | Walter |
| 3,185,443 A | * | 5/1965 | Eitel .................... 254/134.3 R |
| 3,863,897 A | * | 2/1975 | Yeager ................. 254/134.3 R |
| 3,908,962 A | * | 9/1975 | Ross .................... 254/134.3 R |
| 4,019,715 A | * | 4/1977 | Vugrek ................. 254/134.3 R |
| 4,129,287 A | * | 12/1978 | Lindsey et al. ...... 254/134.3 PA |
| 5,454,153 A | * | 10/1995 | Noel ......................... 29/281.1 |
| 6,315,269 B1 | * | 11/2001 | Fleury et al. ........ 254/134.3 PA |

* cited by examiner

*Primary Examiner*—Lee Wilson
(74) *Attorney, Agent, or Firm*—John E. Toupal; Harold G. Jarcho

(57) ABSTRACT

A cable block particularly adapted for use in the installation of aerial cable comprises a main frame member formed at its upper end with an inverted V-shaped strand engaging hanger section, at its lower end with a U-shaped pulley support section, and with a spring-biased, clamping clutch mechanism supported on the upper hanger section. The clutch mechanism comprises a uniquely dimensioned and configured pair of clamping jaws that are spring-biased together. The jaws grip the interposed strand in such a manner that axial movement of the cable block along the strand is permitted in either direction only when an axial moving force above a predetermined level is applied in that direction to the cable block.

15 Claims, 3 Drawing Sheets

CABLE HANGING SYSTEM

FIELD OF THE INVENTION

This invention relates to the installation of cable such as along a series of utility poles, and, more particularly, to a cable block for temporarily supporting a section of aerial cable prior to its being lashed to a supporting strand.

BACKGROUND AND OBJECTS OF THE INVENTION

In the installation of aerial cable, such as coaxial communication cable, a so-called lashing method is employed wherein the cable is secured to a supporting strand (or so-called messenger) by wrapping a fairly large gage lashing band in spiral fashion therearound. Prior to the lashing operation, the aerial cable is temporarily supported in close proximity to the strand by a plurality of cable blocks mounted on the strand, and typically spaced apart at intervals ranging from 10 to 20 feet along a given span thereof, i.e., between a pair of utility poles. The cable blocks are subsequently cumulatively pushed along each successive span of the strand by and ahead of a lashing machine. Upon reaching any given pole defining the end of a lashed cable span, the then stacked array of cable blocks are removed from the strand by a workman, and re-mounted in a spaced array along the next succeeding span of the strand. Thereafter, the lashing machine is also transferred to the other side of the then adjacent pole, and positioned on the strand in front of the first re-mounted cable block in readiness for lashing a new section of cable to the strand along that particular span. In some applications, new cable is lashed to existing cable previously lashed to the strand.

In such an aerial cable installation, it is appreciated that the cable blocks should be constructed such that they are reliably and easily mounted on the supporting strand, and readily movable therealong in the direction of movement of the lashing machine. It is also very important, however, that such a cable block incorporate means to effectively control its longitudinal movement along the supporting strand so that it moves only when and as desired.

Effective control of the cable blocks' movement is very important as the unlashed cable supported thereby tends to exert variable and appreciable longitudinally directed forces on the blocks in the forward and rearward directions along the supporting strand. Such forces are most pronounced when forcing the cable block along the supporting strand, during the threading of a winch line over the respective pulleys of the spaced array of cable blocks, and while the free end of a new reel of cable is pulled thereby over the rollers preparatory to the lashing of that unwound reel of cable to the supporting strand. Even after a portion of a new unwound reel of cable has been temporarily supported by the spaced array of cable blocks along any given span between two utility poles, any excess length of such cable that extends between the last cable block and the ground (or supply reel on the ground) will exert a substantial longitudinal force, in the direction of the lashing machine, against that block initially and, thereafter, possibly against one or more adjacent blocks in a cumulative fashion if they are allowed to become bunched. Thus, unless a longitudinal control mechanism, such as a clutch, is incorporated in the cable blocks to prevent such displacement, they can very readily defeat the purpose intended therewith.

It is also important that the cable blocks grip the strand such that they remain in a substantially vertically oriented position at all times so as to facilitate the guiding of the cable therethrough, as well as through the lashing machine. This also minimizes any tendency of the cable blocks to become jammed on the strand while being cumulatively pushed in tandem by the lashing machine, and also minimizes the possibility that the blocks could become accidentally dislodged from the strand due to very strong gusts of wind, for example.

A prior cable block intended to provide some longitudinal movement control are disclosed in U.S. Pat. No. 3,134,575 to O. L. Walter, and, U.S. Pat. No. 4,019,715 to A. Vugrek. These cable blocks utilize spring-biased and pivotally mounted cams to effect the locking of the cable block from movement along the strand in only one particular direction, but are deficient in that they allow relatively free movement in the opposite direction. This requires the installer to position the cable blocks in a particular direction according to the direction of the forces anticipated. In addition, such mechanisms have also been found to not always provide the degree of positive locking action desired, particularly during the aforementioned winch-line pull-through of a new length of cable, or when hilly terrain is involved.

In addition to the aforementioned desired and important operating characteristics that have been urgently sought in cable blocks heretofore, there has also been a need for a cable block that could equally prevent undesired movement and allow desired movement in either direction. This would allow the cable blocks to remain in place even when subjected to oppositely directed unintentional forces, such as when on opposite sides of a utility pole.

Additionally, it has been a necessity of prior art cable blocks to place alternate cable blocks onto the supporting strand in opposite directions, as shown in U.S. Pat. No. 4,019,715, and to orient the cable blocks according to their forward and rearward operating characteristics, which are both quite burdensome for the installer. The present invention's symmetry in operation allows successive blocks to be positioned without regard to their directions, thereby allowing the operator to install all blocks more simply from the same side of the supporting strand, or without any regard to their directions at all. This is a huge advance to the installation process.

It, therefore, is an object of the present invention to provide a new and improved cable block of simplified, rugged and reliable construction, and which can readily and reliably be mounted on a supporting strand in either direction, maintained in a substantially vertical position, and be readily adjusted so as to allow controllable longitudinal movement along the strand in either direction, relative to a given, as mounted, orientation on the strand, while being sufficiently locked against any undesired movement.

SUMMARY OF THE INVENTION

In accordance with the principles of the present invention, the above and other objects are realized with a cable block comprising a main frame member formed at its upper end with an inverted V-shaped strand engaging hanger section, at its lower end with a U-shaped pulley support section, and with a spring-biased, clutch mechanism supported on the upper hanger frame section.

Considering the clutch mechanism more specifically, it comprises a pair of jaws that are positioned so as to grasp the supporting strand and that are biased together by a spring. The jaws and spring are dimensioned and arranged so that the clamping force on the supporting strand is sufficient to hold the cable block to the supporting strand and deny longitudinal movement even during any unintentionally applied moving force exerted on the cable block, such as wind or the weight of the cable. Yet the clamping force is weak enough to provide a clutch effect that allows longitudinal movement of the block along the supporting strand by intentionally applied moving force such as that used during the usual lashing operation.

Additionally, the clamping force provides the same clutch effect in both directions so that the cable block will function equivalently regardless or the direction it faces or the side of the supporting strand from which it is attached.

The symmetrical nature, configuration and clamping action of the clutch also insures that the cable block, while being pushed along the strand, grips the latter in such a way that the block remains substantially vertically oriented at all times. This, of course, greatly minimizes the possibility of cable block jamming, or dislodgement from the strand.

It should be appreciated that the cable block embodied herein, and described in greater detail below, has universal application in that it may be suspended from any elongated member of generally circular cross-section defining a span between two spaced supports, and temporarily support a second elongated member of similar cross section in close proximity to the first until the two elongated members are permanently secured to each other along the span in a desired manner. However, for purposes of illustration, the subject invention is disclosed herein in connection with one preferred application, namely, the installation of aerial communication cable, wherein cable blocks of the type embodied herein are used to temporarily support the cable along each successive span prior to its being lashed to the supporting strand (or messenger). In that connection, further details and advantages of the invention will be appreciated with reference to the following drawings and description of the preferred embodiment thereof.

BRIEF DESCRIPTION OF THE DRAWINGS

These and other objects and features of the invention will become more apparent upon a perusal of the following description taken in conjunction with the accompanying drawings wherein.

DETAILED DESCRIPTION OF THE PREFERRED EMBODIMENT

Figure 1:
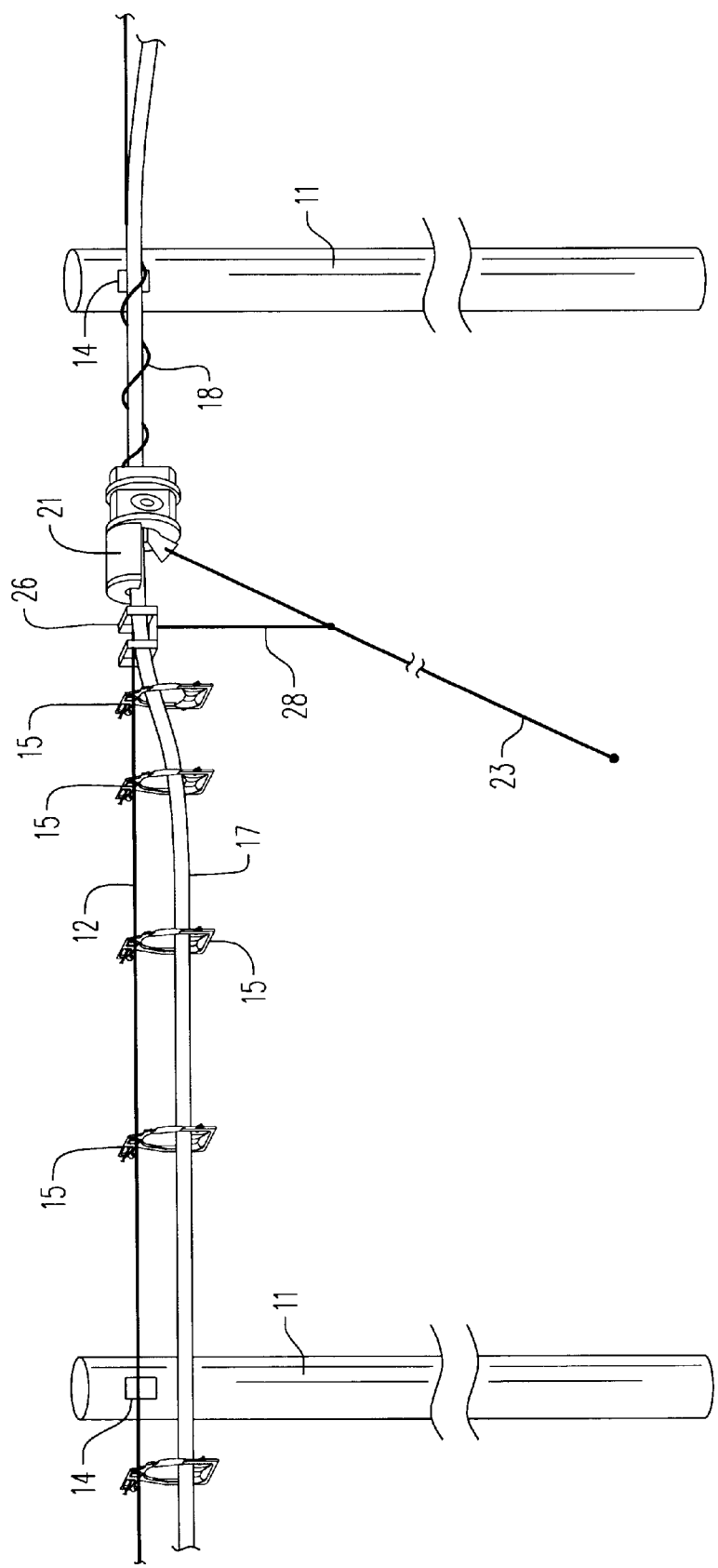
FIG. 1 is a perspective view of a typical lashing operation using cable blocks according to the preferred embodiment of the invention.
Figure 2:
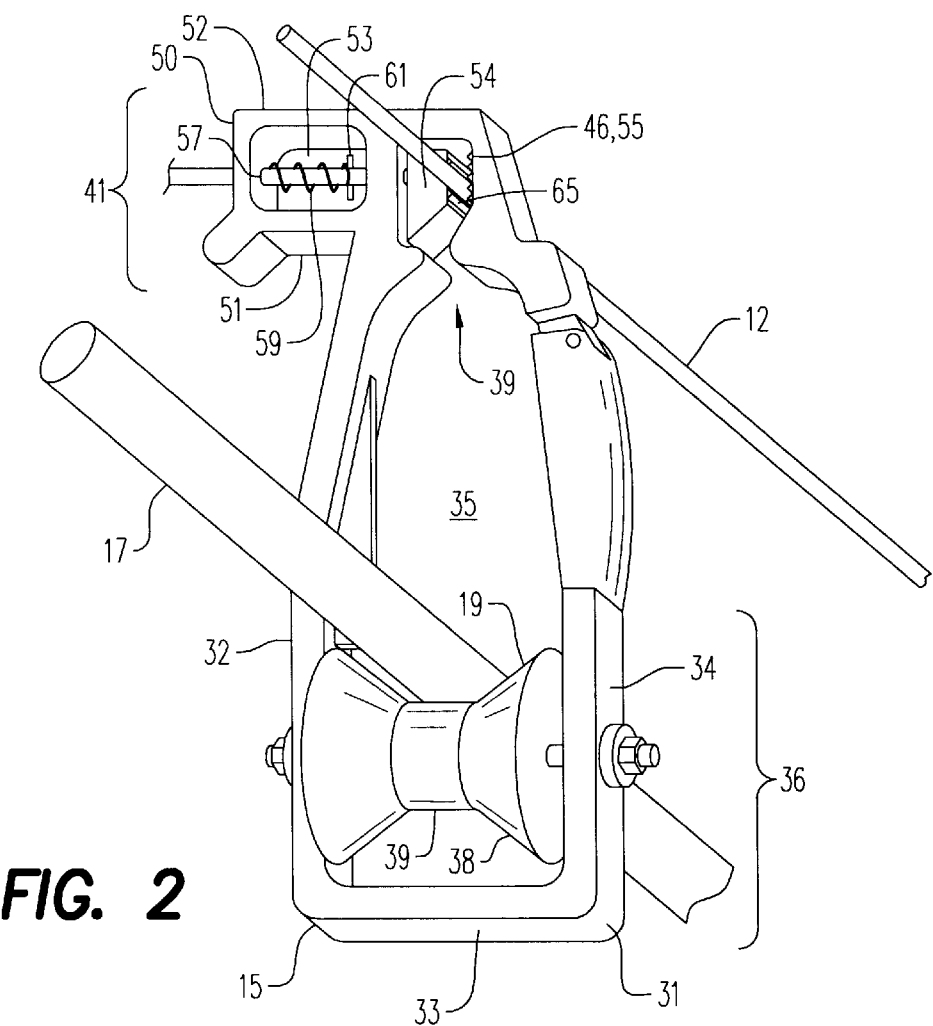
FIG. 2 is a perspective view of one of the cable blocks of FIG. 1 suspended from a supporting strand.
Figure 3:
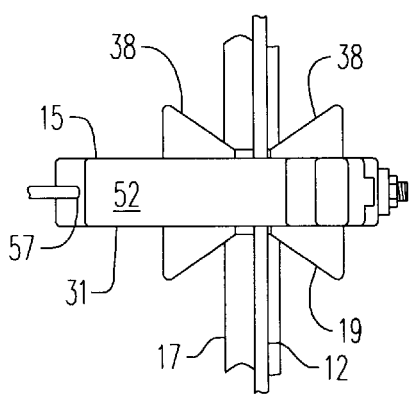
FIG. 3 is a plan view of one of the cable blocks of FIG. 1 suspended from a supporting strand.

Reference is first made to FIG. 1, which discloses a typical segment of a communications pole line including two spaced poles 11, and a supporting strand 12 that spans the distance therebetween at the desired elevation as a result of the strand being secured to each pole by suitable brackets 14.

As also depicted in FIG. 1, a plurality of cable blocks 15, embodying the principles of the present invention, are mounted on the strand 12 at spaced intervals generally ranging from 10 to 20 feet. Such placement is effected in the field either with a so-called bucket truck or from the ground with a modified tree pruner pole, for example. The cable blocks, as previously noted, are employed to temporarily support a cable 17 while it is in the process of being lashed to the strand 12 with a lashing band 18.

Considering the lashing operation more specifically, a conventional cable lashing machine 21 effects a spiral winding motion to the lashing band 18 as it is tightly wound about the strand and cable. The lashing machine is towed along the strand by means of a tow line 23. In some applications, new cable, as distinguished from the lashing band 18, is lashed to existing cable already supported by the strand.

As the lashing machine 21 advances along the strand 12, it cumulatively pushes the spaced array of cable blocks 15 ahead of it until the end of a given span of the strand and cable is reached, whereupon the then juxtaposed array of cable blocks are removed from the strand by a workman and repositioned in a spaced array along the next span of the strand. Similarly, the lashing machine 21 is also transferred to the other side of the then adjacent pole and positioned in front of the first cable block in preparation for the start of a new cable span lashing operation.

As also seen in FIG. 1, a cable guide 26 is mounted on the strand 12 between the lashing machine 21 and the cable block 15 nearest thereto. This guide facilitates the feeding of the cable 17 into the front end of the lashing machine by reason of its being secured to the two line 23 through an auxiliary tow line 28. The cable guide 26 is also constructed with a front face portion that also serves to push the first cable block 15 along the strand 12 in a manner that minimizes any tendency of that block to become tilted from a vertically oriented position. This, in turn, minimizes the possibility of that block, as well as any other blocks, becoming jammed as the lashing machine is continuously advanced along the strand.

Prior to a lashing operation, it is of paramount importance that the cable blocks 15 be substantially locked against unintended movement along the strand. More specifically, at the beginning of any given cable installation, as well as when a new length of cable from a supply reel is to be connected to the terminating end of an installed cable, a pull-in-line (not shown) is initially drawn over the respective rollers 19 of the cable blocks 15, from left-to-right in FIG. 1, and thereafter used to pull the free end of a length of new cable from a supply reel (not shown) over the rollers, with any excess length of cable either being left on the reel, or laid out along the pole line on the ground.

Even after a given length of cable 17 has been drawn over the respective pulleys of a spaced array of cable blocks, the sections of cable that extend from the forward block to the ground and from the rearward block to the supply reel have a tendency to exert substantial longitudinal forces against that block and towards each other. Thus, if the blocks are not reliably prevented from inadvertent longitudinal movement, they would tend to start a chain reaction whereby the blocks would be cumulatively pushed together and, thus, no longer temporarily support the cable at the necessary spaced intervals. The locking mechanism embodied in the cable blocks 15, which mechanism is of particular concern in accordance with the principles of the present invention, will now be considered in detail in connection with a description of the preferred embodiment of the composite cable block.

With specific reference now made to FIGS. 2 through 5, the present cable block 15 is comprised of a main frame 31 constructed of any suitable material that is preferably cast or otherwise fabricated as a unitary member. The annular main frame is formed with vertically extending arm 32 that is integrally connected at its lower end to a horizontal leg 33 which, in turn, is connected to a short vertically oriented leg 34. The lower portion of the arm 32 and the legs 33 and 34 form a U-shaped section 36 within and on which the aforementioned pulley 19 is rotatably mounted, by means of a suitably journalled shaft 37. The pulley 19 is formed with tapered hub shaped portions 38, and cylindrical portion 39.

Figure 5:
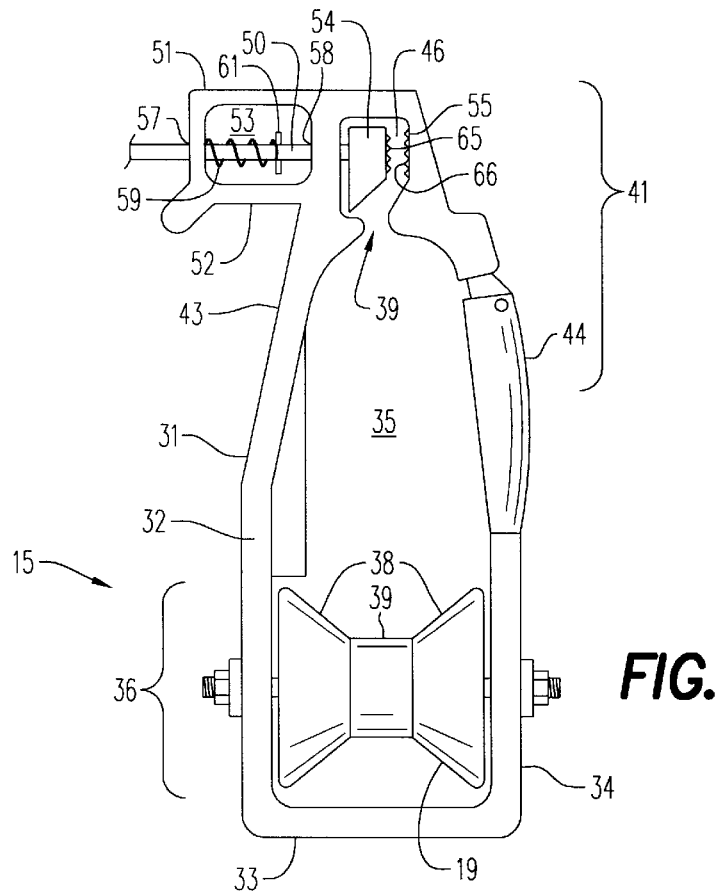
FIG. 5 is a longitudinally directed elevational view of one of the cable blocks of FIG. 1 suspended from a supporting strand.
Figure 4:
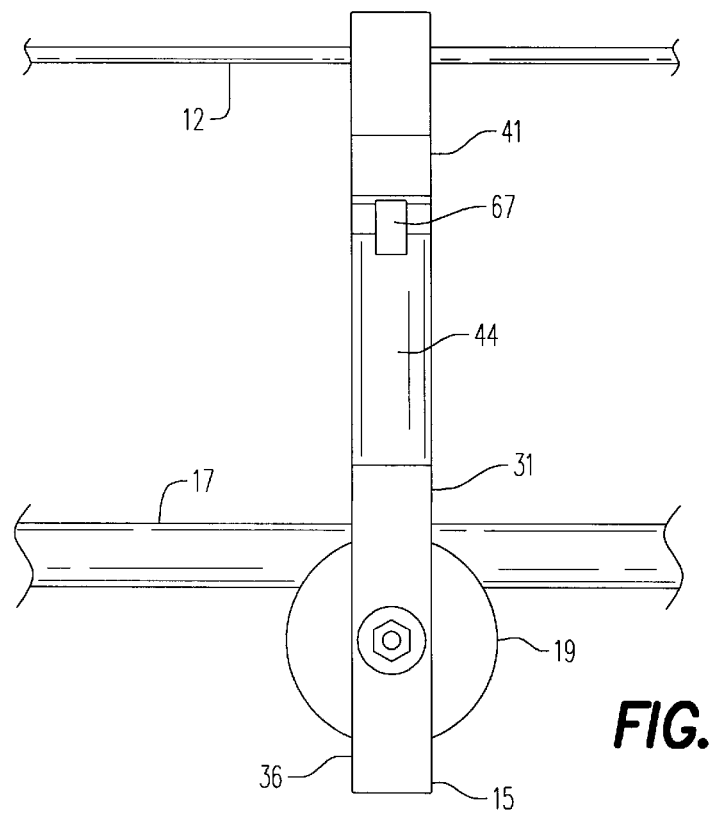
FIG. 4 is a right side elevational view of one of the cable blocks of FIG. 1 suspended from a supporting strand.

At the upper end of the vertically oriented arm 32, and integral therewith, is an outwardly extending hanger section 41 that overlies the pulley 19. The hanger section is actually formed with an essentially inverted V-shaped configuration having wall portion 43 and pivoting latch 44. The wall portion 43 and latch 44 are oriented relative to each other so as to form a central and longitudinally extending vertex. The main frame's U-shaped section and hanger section 41 thereby form an enclosed interior opening 35 that can only be accessed through a slot formed in the leg 34 and communicating with the interior opening 35. Normally, the latch 44 is in a closed position filling the slot as shown in FIGS. 4 and 5. However, transverse access of the strand 12 and cable 17 into the opening 35 is obtained by the pivotal opening of latch 44. The apex 39 of interior opening 35 is actually modified to form a tunnel 46 that is dimensioned so as to loosely and partially receive the supporting strand 12 therewith.

In accordance with the primary aspect of the invention, a strand clamping clutch mechanism 50, adapted to substantially lock the cable block from movement in either direction, is supported by a secondary frame 51, formed as an integral part, and located on the top side, of the main frame hanger section 41. The secondary frame includes an integral peripheral wall 52 surrounding a hollow center portion 53.

With particular reference to FIG. 5, the clamping clutch mechanism 50 is comprised of a mutually disposed pair of jaws, biased moving jaw 54 and fixed jaw 55 that are positioned adjacent to and in communication with tunnel 46. Biased moving jaw 54 is supported on a horizontally oriented shaft 56, that is loosely passed through a pair of accommodating coaxial apertures 57 and 58, that are formed through the secondary frame's peripheral wall 52 and hanger section's wall portion 43, respectively. Biasing spring 59 is disposed around shaft 56 in the secondary frame's hollow center portion 53, between apertures 57 and 58. Roll pin 61 captures the biasing spring 59 between itself and the secondary frame's peripheral wall 52 in a manner that causes spring 59 to be compressed as the jaws are opened. This provides the biasing force for clamping the supporting strand 12 and the clutching feature. Mating faces 65 and 66 of the jaws 54 and 55, respectively, are knurled to improve the gripping characteristics of the jaws.

In a typical aerial cable installation application, each of a plurality of the cable blocks 15 embodied herein, as previously noted, are mounted in a spaced array along the supporting strand 12 either directly from a bucket truck, or from a remote point, such as from the ground, by means of a suitable pole or rod, not shown, but of the type such as those depicted in the aforementioned patents. The cable block 15 is positioned on either side of the supporting strand 12 with latch 44 adjacent to the supporting strand 12. The cable block 15 is then moved horizontally towards the supporting strand 12 so that the supporting strand 12 forces the latch 44 to open inwardly, allowing the supporting strand to transversely enter the main frame's interior opening 35.

Latch 44 recloses under the force of latch spring 67 to avoid inadvertent displacement of the cable block 15 from the supporting strand.

The cable block 15 is then lowered to allow the supporting strand to enter the tunnel 46 of the interior opening's apex 39 and, under the weight of the cable block, to force open the biased moving jaw 54 from the fixed jaw 55 such that the supporting strand is captured between the jaws and held longitudinally in place by the force of spring 59.

After the pulley block 15 has been positioned on the strand 12 by means of the above described placement tool, for example, the latter is readily removed from the cable block by a workman on the ground and lashing operations according to the practices of the prior art are conducted with all of the advantages provided by the present invention and heretofore described.

It is obvious that various modifications may be made to the illustrative embodiment of the invention, and that a number of alternatives may be provided without departing from the spirit and scope of the present invention.

What is claimed is:

1. A cable block adapted for mounting on a supporting strand, and for temporarily supporting a section of cable prior to the latter being supported along and by the strand and comprising:

a frame having at its upper end a strand-engaging hanger section, and at its lower end a pulley support section;

a pulley rotatably mounted on said lower support section for temporarily supporting and guiding the cable; and a strand confining clutch mounted on said upper frame hanger section, said clutch comprising a pair of jaws biased together and adapted to engage the supporting strand such that said jaws permit axial movement of said cable block along the strand in either direction when an axially directed force above a predetermined level is applied in said direction to said cable block and prevent said axial movement in either direction in the absence of said force.

2. A cable block according to claim 1 wherein said strand-confining clutch further comprises a spring adapted for biasing said jaws together and for exerting a clamping force on the supporting strand.

3. A cable block according to claim 2 wherein at least one of said jaws further comprises a knurled face adapted for being pressed against the supporting strand by the spring to reinforce the engagement of the jaws therewith.

4. A cable block according to claim 3 wherein said pair of jaws comprise a fixed jaw and a movable jaw, and said spring is adapted for biasing said movable jaw towards said fixed jaw.

5. A cable block according to claim 1 wherein said frame is annular and defines an opening in communication with said jaws and adapted to receive and allow relative longitudinal movement of the strand.

6. A cable block according to claim 5 wherein said frame further defines a slot communicating with said opening and a latch movable between a closed position closing said slot and an open position allowing selective passage of an intermediate portion of the strand transversely into said opening.

7. A cable block according to claim 6 wherein said latch is pivotable and including bias means biasing said latch into said closed position.

8. A cable block according to claim 7 wherein said strand-confining clutch further comprises a spring adapted for biasing said jaws together and for exerting a clamping force on the supporting strand.

9. A cable block according to claim 8 wherein at least one of said jaws further comprises a knurled face adapted for being pressed against the supporting strand by the spring to reinforce the engagement of the jaws therewith.

10. A cable block according to claim 9 wherein said pair of jaws comprise a fixed jaw and a movable jaw, and said spring is adapted for biasing said movable jaw towards said fixed jaw.

11. A cable block according to claim 6 wherein said latch in said open position further allows selective passage of an intermediate portion of the cable through the slot.

12. A cable block according to claim 11 wherein said latch is pivotable and including bias means biasing said latch into said closed position.

13. A cable block according to claim 12 wherein said strand-confining clutch further comprises a spring adapted for biasing said jaws together and for exerting a clamping force on the supporting strand.

14. A cable block according to claim 13 wherein at least one of said jaws further comprises a knurled face adapted for being pressed against the supporting strand by the spring to reinforce the engagement of the jaws therewith.

15. A cable block according to claim 14 wherein said pair of jaws comprise a fixed jaw and a movable jaw, and said spring is adapted for biasing said movable jaw towards said fixed jaw.

\* \* \* \* \*